June 23, 1942.  J. O. HARDESTY ET AL  2,287,759
PROCESS FOR THE GRANULATION OF FERTILIZERS
Filed March 15, 1940
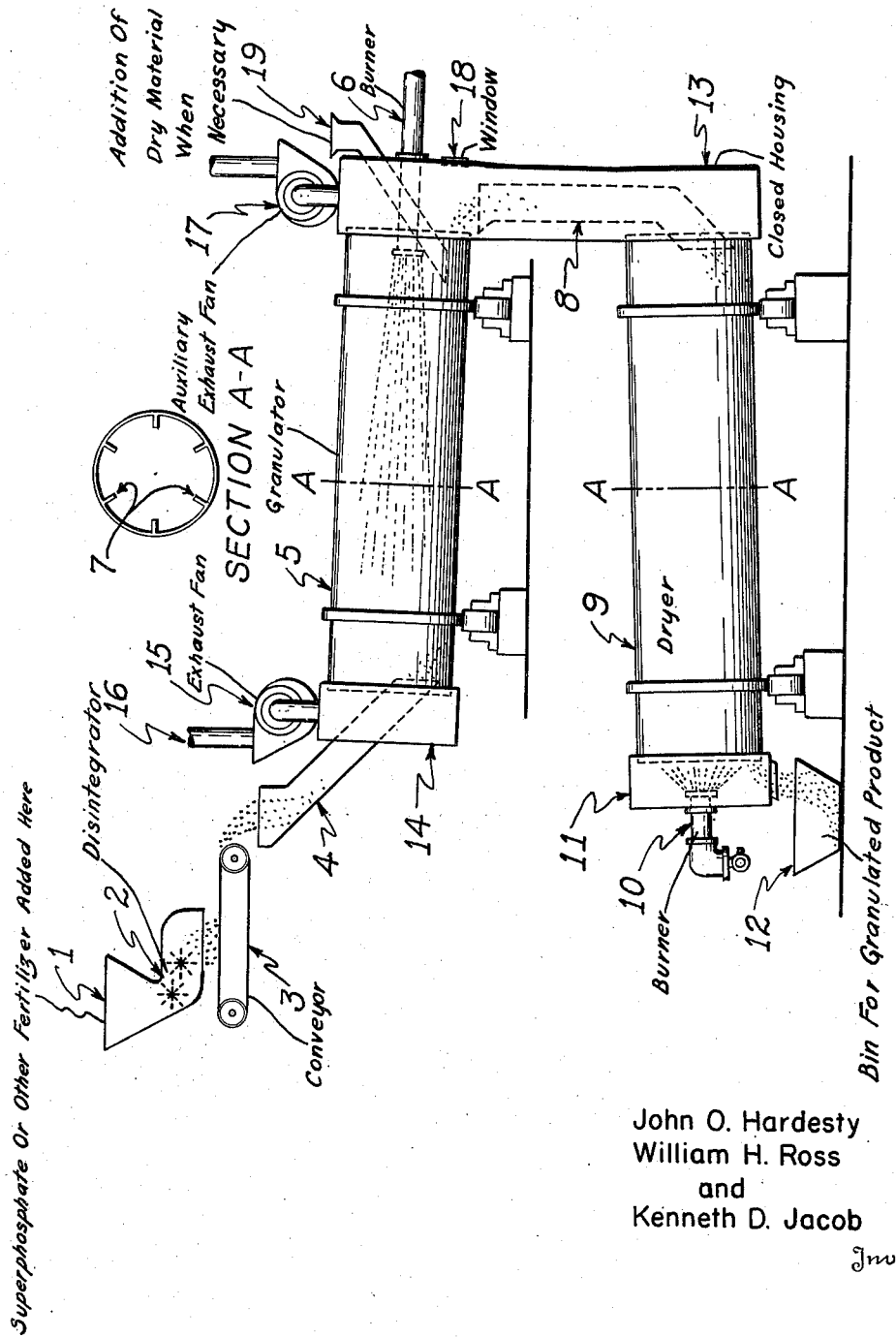
John O. Hardesty
William H. Ross
and
Kenneth D. Jacob
Inventors
By J. G. Menikheim
Attorney Patented June 23, 1942

2,287,759

UNITED STATES PATENT OFFICE 2,287,759

PROCESS FOR THE GRANULATION OF FERTILIZERS

John O. Hardesty, Arlington, Va., and William H. Ross and Kenneth D. Jacob, Washington, D. C., assignors to Henry A. Wallace, as Secretary of Agriculture of the United States of America, and his successors in office Application March 15, 1940, Serial No. 324,016

10 Claims. (Cl. 71—40)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to us of any royalty thereon.

This invention relates to a process for improving the physical condition of superphosphates prepared by treatment of phosphate rock with sulfuric or phosphoric acids, or a mixture of both, and of so-called commercial fertilizer mixtures containing superphosphates, particularly for converting such fertilizers into a granular form by the rotary drying method of granulation.

One of the objects of our invention is to provide a method for the treatment of superphosphates and fertilizer mixtures containing superphosphates to produce products composed of spherical granules of predetermined structure and of substantially uniform size.

Another object of our invention is to provide a continuous method for the production of such granules, thereby practically eliminating subsequent operations, such as crushing and screening the product and re-processing the fine material, which heretofore has been necessary in the manufacture of granular materials.

Still another object of our invention is to provide a method for controlling the size, apparent density, and degree of hardness of the granules.

Still another object of our invention includes the provision of favorable conditions for the granulation of fresh den superphosphates, cured superphosphates, and fertilizer mixtures containing superphosphates, without the supplemental addition of water during the granulating process.

Individual fertilizer materials usually contain one, but sometimes two or all three of the plant food constituents, viz: nitrogen, phosphoric acid and potash. Combinations of such individual materials to give products containing two or all three of the plant food constituents in desired proportions are commonly referred to as fertilizer mixtures. A fertilizer mixture containing all three plant food constituents is said to be a complete mixture and one containing less than three is said to be incomplete. The grade of a fertilizer refers to its composition in percentages of N, $P_2O_5$, and $K_2O$ in forms available to plants and expressed in that order. For example, a 4—8—6 grade refers to a fertilizer mixture containing 4% N, 8% $P_2O_5$ and 6% $K_2O$; an 0—20—0 grade refers to a superphosphate containing 20% $P_2O_5$.

The preparation of superphosphate, and fertilizer mixtures, in a granular condition offers the advantages that it shortens the curing time, reduces the tendency to cake during storage, facilitates handling and bagging, eliminates losses by dusting, when the material is distributed in the field on windy days, and greatly improves its drillability.

Many processes are now in use, or have been proposed, for the granulation of fertilizer materials and mixtures. Easily fusible substances can be granulated very conveniently by spraying a melt of the material into a cooling tower, and a number of fertilizer materials, such as urea and sodium nitrate, are now being granulated in this way. Materials, such as superphosphates, and ordinary fertilizer mixtures, cannot be fused without decomposition, and the principal method heretofore used for granulating fertilizers of these types is one that involves the subsequent drying of the granules obtained by rolling or tumbling the moist material in a rotating drum, or other device. This method of granulation is commonly referred to as one of rotary drying.

Granulation by the method of rotary drying takes place when two or more particles of a material, or mixture of materials, stick together with sufficient tenacity to withstand the rolling or tumbling action to which the resulting larger particles or granules are subjected in the course of their formation. Granulation by this method can only occur, therefore, in materials that exhibit some plastic properties. Inasmuch as the plastic properties of moist superphosphates, especially fresh den superphosphates, and moist fertilizer mixtures containing superphosphates, are very pronounced, these materials are particularly amenable to granulation by this method.

Superphosphates and fertilizer mixtures in granular form are used for various purposes which require products that are widely different with respect to the physical structure of their granules. For example, hard, dense, gritty granules are desirable in superphosphate to be used for spreading on the floor of dairy barns to keep down odors and prevent loss of nitrogen from the moist manure. This type of granule has the advantage that it does not become slippery under foot as readily as a pulverized or a soft, granular superphosphate. It is well known that hard, dense granules of superphosphate will not absorb ammonia as uniformly as those having a more porous structure. Therefore a relatively soft, porous granule is desirable in granular superphosphate that is to be subjected to commercial ammoniation. Porous granules of superphosphate and fertilizer mixtures are often preferable for application to crops which require rapid availability of nutrients. On the other hand, a dense, hard, compact granule may be advantageous for use on soils of high fixing power or for broadcast application, such as top-dressing for pastures, where rapid disintegration of the granule in the soil may be undesirable.

The granulation of mixtures and materials by the method of rotary drying is an old art, and we are aware that specific applications of this method to the treatment of superphosphate and mixed fertilizers are disclosed in United States Patents 1,875,879 and 2,136,793. Heretofore, it has been impossible to obtain granules of uniform size, as they issued from the granulator, or nodulator. Nor has it been possible to control the process so that any desired size or structure of granules could be obtained. In the prior art as applied to the treatment of superphosphate and fertilizer mixtures no provisions are made for regulating the temperature of the material either during or preceding granulation in a non-drying atmosphere, or for reducing the material to a pulverulent state prior to its treatment under such conditions. Operation of the process according to the prior art has the disadvantage that the water or aqueous solution required to effect granulation of the fertilizer is introduced in such a manner, and in such quantity as to disturb the equilibrium conditions between the solid material and the solution phase. This greatly increases the tendency of the material to adhere to the walls of the granulating equipment, gives rise to granules of widely varying size and adds to the cost of drying the product. About one-fourth to one-third of the material thus produced contains nodules which are too large for use as fertilizer. The necessary procedure of screening the product, crushing the large proportion of oversize nodules, rescreening to eliminate the fines produced by crushing, and returning to the process a considerable quantity of finely divided material, increases the cost of the final product. Furthermore, in comparison with a product composed solely of spherical particles, the presence of the large proportion of non-spherical particles in the final product of the prior art, resulting from the crushing of the large nodules, renders the product more susceptible to caking during storage, and also adversely affects the ease with which it flows through drills and other mechanical devices used for supplying fertilizers to the soil.

The range of granule size in the final product of the prior art is between 8 and 100 mesh. This range of particle size, especially in a product consisting of a mixture of granulated ingredients of different particle size, will not give satisfactory mechanical distribution. The fines, consisting of one ingredient, will sift to the bottom of the fertilizer drill, while the course material, consisting of other ingredients, will be left on top with the result that different materials will be delivered at different times during field application of the fertilizer. Such unbalanced application in the field materially reduces the value of the fertilizer to the crop.

With regard to superphosphates, the free water, which exists principally if not entirely on the surface of the crystals, is present in the form of a solution of the constituents. This solution is commonly called the "superphosphate solution", or the "solution phase", and consists principally of a saturated or supersaturated solution of monocalcium phosphate in aqueous phosphoric acid. The "solution phase" of a mixture, consists principally of a saturated solution of the individual materials in an aqueous medium, or if superphosphate is present, in an aqueous $H_3PO_4$ medium. Inasmuch as the content of soluble materials in the solution phase is governed principally by the relative proportions of free water and free $H_3PO_4$, the quantity of the solution phase by weight can be expressed conveniently in terms of the sum of the percentages of free water and free $H_3PO_4$.

The plasticity of superphosphate, and fertilizer mixtures containing superphosphate, is governed principally by the amount and fluidity of the solution phase, and the uniformity of its distribution throughout the mass of material. This solution phase, surrounding each crystal or minute particle of the initial material to be granulated, is substantially in equilibrium with the solid phase of the material.

We have found that the solution phase of these materials is surprisingly sensitive to temperatures between 60° C. and 100° C., and that with a predetermined amount of solution phase there is always a certain definite temperature within this range at which the solution phase is sufficiently viscous as to engender cohesive forces sufficient to hold together the small particles of material, but insufficient to cause agglomeration of the larger, heavier particles during the rolling or tumbling action which they receive during the granulation process.

We have also found that the regulation of the temperature is essential for the direct production of granules of uniform size.

We have further found that any addition of either moisture, or dry, solid material, during or immediately preceding the formation of granules, disturbs the equilibrium conditions between liquid and solid, and is detrimental to the production of granules of uniform size.

We have further found that a very uniform product containing granules of the desired size, degree of density and hardness may be obtained by controlling the amount and distribution of the solution phase of the finely divided material entering the granulator; regulating the temperature of this material in the granulator to give any optional, uniform size of either a porous, loosely-knitted granule or a compact, dense granule as desired; and, when necessary, drying the resulting granules at a temperature not in excess of and preferably below that at which they are formed.

It is necessary to dry a granulated superphosphate or fertilizer mixture having a high moisture content. Inasmuch as the moisture necessary to induce granulation decreases as the temperature increases, the most economical procedure for granulating such materials is obviously one in which granulation is effected at as low a moisture content and at as high a temperature as is consistent with the production of the desired size of granules, without destroying the fertilizer value contained therein. Thus, by regulating the moisture content of superphosphates or fertilizer mixtures in such a manner that a high temperature is necessary to effect granulation, it is possible to obtain directly a granular product having such a low moisture content that, after being allowed to cool, it can be conveyed to the storage pile without subjecting it to drying by artificial means. Allowing the granules to cool before storage practically eliminates caking in the storage pile.

The amount of the solution phase of the mixture entering the granulator is the primary factor governing the temperature necessary to induce granulation. When fresh den superphosphate is used in preparing the fertilizer mixture, the amount of solution phase in the superphosphate is often adequate to effect granulation of the entire mixture, but with mixtures prepared from cured or partially cured superphosphates, or with mixtures containing no superphosphate, it is usually necessary to increase the quantity of solution phase by the addition of water or other aqueous medium. Previous methods of granulation by rotary drying have accomplished this during or just preceding the granulating process which is detrimental to the production of granules of uniform size. Granules of uniform size can be obtained only when the solution phase of the mixture is uniformly and thoroughly distributed to each particle throughout the mass of material as it enters the granulator. The solution phase in a fresh den superphosphate is uniformly and thoroughly disseminated throughout the mass, and we have discovered that when a material of this kind is granulated at some specific temperature between 60° C. and 100° C. depending on the quantity of solution phase present, no addition of water, which would interfere with the equilibrium of the solution phase, is necessary to induce granulation.

With cured superphosphates and fertilizer mixtures, it is often necessary to increase the amount of solution phase, but the thorough dispersion of this added aqueous medium is a slow process and can be effected only by allowing the moistened particles of the mixture to remain for at least twelve hours under conditions such that substantial loss of water by evaporation does not occur. When such preconditioned fertilizers are granulated at a temperature of 60° C. to 100° C. no further addition of water, which would interfere with the equilibrium of the solution phase, is necessary to induce granulation. We have found that by our process no further addition of water, or other aqueous medium is required.

The addition of water during granulation, we have found, interferes with the equilibrium between the solid constituents and the solution phase, and we, therefore, do not recommend its use. Control of granulation by regulating the temperature of the mixture in the granulator, rather than by the addition of water during granulation, offers the advantages that the heretofore troublesome tendency of the material to stick to the walls of the granulating equipment is greatly reduced, a uniform product is obtained of any desired size, density and hardness of granules, and the cost of driving off superfluous moisture is eliminated.

In our process of granulation the size of granules may be controlled so that as much as 96% of the product issuing from the dryer will be within the size range of, for example, 5 to 20 mesh or 10 to 40 mesh, as desired. The heretofore troublesome procedure of milling, screening and re-processing a large proportion of oversize material is reduced and the absence of irregular particles and fine material in the granulated product is conducive to even distribution during field application of the fertilizer.

For a better understanding of our invention, reference is made to the accompanying drawing, which forms a part of this application, and which is a vertical sectional view of one form of apparatus for practicing our invention, without limiting the invention to the particular construction and arrangement or combination of parts shown therein.

Superphosphate prepared as in ordinary commercial practice or a fertilizer mixture, preconditioned with the proper amount of solution phase to give satisfactory granulation at an elevated temperature, is delivered by any suitable means, not shown, into hopper 1, whence it is discharged into disintegrating device 2, for reducing the material to the desired degree of fineness. A suitable conveyor 3 carries the finely divided mixture to chute 4 discharging into a rotary granulating cylinder 5 operating by any suitable means, not shown, and provided with internal means 6 for conveying heat. Fins 7, adapted to extend the entire length of cylinder 5 are equally spaced around its inner circumference, and facilitate the rolling and tumbling of the finely divided material while it is being heated in a substantially non-drying atmosphere to increase the fluidity of the solution phase and to bring about cohesion of the particles. Fins 7 are of such height that only a mild cascading action is imparted to the particles of material.

The resulting product, which is composed of spherical particles of substantially uniform size, is discharged from granulating cylinder 5 through chute 8 into a rotary drying cylinder 9 operating by any suitable means, not shown, and is dried, if necessary, by a countercurrent flow of hot gases from an oil or gas burner 10 enclosed in a suitable firebox 11. Drying cylinder 9 is also provided with fins 7, as in granulating cylinder 5, but in this case the fins are wider so as to impart a more vigorous cascading action to the particles of material and thereby facilitate the drying action of the hot gases. If the moisture content of the granulated superphosphate, or the fertilizer mixture, as it issues from granulating cylinder 5 is such that no great amount of artificial drying is required, the action of burner 10 is stopped and the material is allowed to pass through drying cylinder 9, thereby effecting partial drying and cooling of the granules. The granular material is discharged into bin 12, whence it is transported, by any suitable means, not shown, to the curing or storage pile, not shown.

The hot, moist gases from drying cylinder 9 pass into enclosure 13, thence through the granulating cylinder 5 and enclosure 14, and are discharged into the atmosphere through exhaust fan 15 and stack 16. The quantity of gas passing through granulating cylinder 5 can be controlled, if necessary, by means of the auxiliary exhaust fan 17. Thus, means are provided whereby the atmosphere in granulating cylinder 5 can be maintained in a substantially non-drying condition, while at an elevated temperature. Observations of the material passing through granulating cylinder 5 may be made through window 18. Small amounts of dry, pulverized material may be added to the granular material, when necessary, by means of chute 19, which remains closed when not in use.

Inasmuch as fresh den superphosphate, such as that commonly produced in commercial practice, naturally contains a sufficient quantity of the solution phase in a thoroughly dispersed condition, it is suitable for immediate granulation by our process in which we regulate the temperature of the material in cylinder 5, thereby causing uniform granulation, without further addition of water, or other aqueous medium. Fertilizer mixtures which are properly conditioned, either by virtue of the solution phase of fresh den superphosphate contained in the mixture, or by the addition of water in the conditioning period previous to subjecting it to granulation, as hereinabove described, are suitable for granulation by our process in the same manner, without further addition of water or other aqueous medium immediately preceding or during the granulation treatment. Such preconditioned material may be discharged directly into hopper 1, and thence into disintegrating device 2. This device operates on the principle of the rasping device, so commonly used in superphosphate plants, in that it crumbles lumps by a shattering treatment. It is therefore much more effective in crumbling these moist materials than any form of crushing device. In plants equipped with certain types of mechanical den systems, the device used to excavate the den may also serve to disintegrate the superphosphate to the desired degree of fineness, in which case the excavator may discharge directly onto conveyor 3.

We have found that the physical structure of the granules, as well as their size and shape, can be controlled by regulation of the temperature in cylinder 5 during the granulating process. For example, a fresh den superphosphate containing a total of 21% of free water and free $H_3PO_4$ was passed through a disintegrator and divided into two portions. One of these portions was introduced into cylinder 5 and was heated to 92° C. in a non-drying atmosphere under conditions such that this granulating temperature was reached just before the granular material was discharged into chute 8. The product was subsequently dried to a moisture content of approximately 4%. The dried product contained loosely-knitted, porous granules exceptionally uniform in size and had a volume-weight of 0.99 and a crushing strength of only 70 pounds per square inch. The second portion of the superphosphate was brought to the granulating temperature of 92° C. shortly after it entered cylinder 5 and was maintained at this temperature for about 10 minutes before it was discharged into the rotary drying cylinder 9. The continued rolling at the temperature necessary to effect granulation produced dense, well-rounded granules, uniform in size, which, after drying to about 4% moisture, had a volume-weight of 1.15 and a crushing strength of 300 pounds per square inch.

Ordinarily the outer surfaces of the loosely-knitted, porous granules produced, as in the above illustration, are sufficiently dry so as to insure no further agglomeration of particles during the drying operation. However, the compacting effect of continued rolling to give dense, hard granules forces the solution phase of the mass to the outer surfaces of the resulting granules, and it is often necessary to add a small amount of finely ground dry material through chute 19 for the purpose of coating these moist granules in order to prevent further agglomeration both in the drying step and during subsequent storage of the granulated product. This added dry material may be of the same chemical composition as that of the granules or it may be an entirely different material depending upon the nature of the physical requirements placed on the granulated product. Thus, in the process of granulation by rotary drying herein described, we are able to produce a loosely-constructed, porous, soft granule or a compact, dense, hard granule as desired.

While the above illustrations pertain only to fresh den superphosphate, we have made numerous tests with fertilizer mixtures containing superphosphate and have found that such mixtures may be similarly treated with the same results obtained in the granular, or end product.

The continuous cascading action of the mixture in cylinder 5, prevents the formation of large lumps and leaves the individual particles of the mixture free to form granules of desired size. This is accomplished by controlling the temperature of the finely divided mass in cylinder 5. As we show in the following example, the old practice of adding an aqueous medium to the fertilizer mixture during or immediately before the modulating operation is detrimental to the direct production of granules of uniform size.

A 6–8–4 grade of fertilizer mixture made from superphosphate, $(NH_4)_2SO_4$, urea, KCl and dolomite was divided in four portions. Preliminary tests showed that it was necessary for this material to contain 11.5% water in order to effect granulation of the particles. Accordingly, this quantity of water was added in a uniform manner to all four portions, one of which was granulated immediately, and the other three after standing in closed containers for approximately 6, 12 and 24 hours, respectively. In all cases the maximum temperature during granulation in cylinder 5 was 72° C., and the maximum temperature during drying in cylinder 9 was 70° C. In the batch granulated immediately after the addition of water the quantity of granules in the range 5–20 mesh amounted to only 78% and, in the batch granulated after standing for 6 hours, 82%, whereas in the batches granulated after standing for 12 and 24 hours the quantity of 5–20 mesh granules amounted to 92%. The temperature in this instance was maintained at 72° C. in order to prevent extensive decomposition of the urea.

By way of illustration, we may produce a product, 96% of which is 5-mesh to 20-mesh in size, by employing a fresh den superphosphate, made from Florida pebble rock and containing approximately 11% moisture and 8.5% free $H_3PO_4$. The initial material may be disintegrated to 8-mesh or smaller size, and immediately granulated without the addition of water and at a temperature not exceeding 85° C. The granular product may be dried, if necessary, at 80° C.

Under non-drying conditions, the fluidity of the solution phase and, consequently, the plasticity of the superphosphate, or fertilizer mixture increase with the temperature, and hence the total amount of solution phase necessary to effect satisfactory granulation can be decreased by increasing the temperature at which the process is carried out. Furthermore, a much greater degree of uniformity in particle size can be obtained by granulating a superphosphate or mixture at a controlled elevated temperature than by increasing the amount of the solution phase while granulating at atmospheric temperature. The following examples show the relation between the amount of solution phase, the temperature during granulation, and the resulting uniformity in size of granules obtained.

A cured Florida pebble superphosphate, that contained 7.4% free water and 2.1% free $H_3PO_4$ could not be granulated without increasing the amount of the solution phase. This material was passed through an 8-mesh screen and divided into several batches, each of which was moistened with sufficient water to give the amount of solution phase indicated in column 2, Table I. Each batch of this preconditioned material was stored in a closed container overnight and then subjected to granulating treatment for 15 minutes in a non-drying atmosphere, and the moist granules were allowed to dry in a thin layer on trays at atmospheric temperature. The results were as follows:

TABLE I.—*Superphosphates*

| Batch No. | Solution phase (free water plus free $H_3PO_4$) | Maximum temperature of material during granulation | Weight-proportion of granules passing a 5-mesh screen but retained on a 20-mesh screen | Remarks |
|---|---|---|---|---|
| | Per cent | °C. | Percent | |
| 1 | 20.9 | 30 | 0 | All granules much larger than 5-mesh. Pasty condition. |
| 2 | 19.4 | 30 | 61 | Remainder mostly larger than 5-mesh. |
| 3 | 18.2 | 30 | | Little or no granulation occurred. |
| 4 | 18.2 | 59 | 73 | Remainder mostly smaller than 20-mesh. |
| 5 | 18.2 | 68 | 87 | Remainder mostly larger than 5-mesh. |
| 6 | 18.2 | 81 | 59 | Remainder larger than 5-mesh. |
| 7 | 16.8 | 54 | | Little or no granulation occurred. |
| 8 | 16.8 | 75 | 76 | Remainder mostly smaller than 20-mesh. |
| 9 | 16.8 | 87 | 94 | Remainder mostly larger than 5-mesh. |
| 10 | 16.8 | 96 | 86 | Remainder larger than 5-mesh. |
| 11 | 15.9 | 97 | 88 | Remainder mostly smaller than 20-mesh. |

From the above, it will be seen that the temperature of the superphosphate during granulation can be increased as the amount of solution phase is decreased, and that the maximum quantity (94%) of uniform 5–20-mesh granules was produced when the material contained 16.8% of solution phase and was granulated at 87° C. Thus, only 6% of the resulting product was of undesirable size, or larger than 5-mesh.

By way of further illustration, an 8—16—16 grade of fertilizer mixture containing ammoniated superphosphates, ammonium sulfate, potassium nitrate, potassium chloride and calcined kieserite could not be granulated without increasing the amount of solution phase. This mixture was passed through an 8-mesh screen and divided into several batches, each of which was moistened with sufficient water to give the amount of solution phase indicated in column 2, Table II. Each batch of this preconditioned material was stored in closed containers overnight and then subjected to granulating treatment for 15 minutes in a non-drying atmosphere, and the moist granules were allowed to dry in a thin layer on trays at atmospheric temperature. The results were as follows:

TABLE II.—*8—16—16 mixture*

| Batch No. | Solution phase | Maximum temperature of mixture during granulation | Weight-proportion of granules passing a 5-mesh screen but retained on a 20-mesh screen | Remarks |
|---|---|---|---|---|
| | Per cent | °C. | Per cent | |
| 1 | 10.5 | 30 | 0 | All granules much larger than 5-mesh. Pasty condition. |
| 2 | 9.5 | 30 | 21 | Remainder mostly larger than 5-mesh. |
| 3 | 8.3 | 30 | | Little or no granulation occurred. |
| 4 | 8.3 | 50 | 39 | Remainder mostly smaller than 20-mesh. |
| 5 | 8.3 | 65 | 57 | Remainder mostly larger than 5-mesh. |
| 6 | 8.3 | 80 | 44 | Remainder larger than 5-mesh. |
| 7 | 7.0 | 70 | | Little or no granulation occurred. |
| 8 | 7.0 | 83 | 80 | Remainder mostly smaller than 20-mesh. |
| 9 | 7.0 | 90 | 89 | Remainder mostly larger than 5-mesh. |
| 10 | 7.0 | 95 | 82 | Remainder larger than 5-mesh. |
| 11 | 6.2 | 98 | 79 | Remainder mostly smaller than 20-mesh. |

From the above, it will be seen that the temperature of the mixture during granulation can be increased as the amount of solution phase is decreased and that the maximum quantity 89%) of uniform 5–20-mesh granules was produced when the mixture contained 7.0% of solution phase, and was granulated at 90° C. Thus, only 11% of the resulting product was of undesirable size, or larger than 5-mesh.

It will be seen from Tables I and II that the temperature of the material during granulation must be regulated to some specific degree, depending on the amount of solution phase present, in order to obtain the maximum quantity of uniform 5–20-mesh granules.

The temperature of the moist granules during the initial stage of drying in cylinder 9 must be somewhat below the maximum temperature reached during their formation in cylinder 5. Otherwise, agglomeration of the particles will continue during the drying operation, and the final product will usually contain a greatly increased proportion of undesirably large granules. The adverse effects of high temperatures during the initial stages of rotary drying are much more pronounced with materials containing high proportions of solution phase and granulated at low temperatures than with those containing smaller proportions of solution phase and granulated at higher temperatures. For example, equal weights of some of the moist granulated materials obtained in the tests cited in the preceding Tables (I and II) were dried as rapidly as possible at various uniform temperatures in a small rotating cylinder to a moisture content of approximately 6% for the superphosphate (Table III)

and 3% for the fertilizer mixture (Table IV). The results were as follows:

TABLE III.—*Superphosphate*

| Solution phase (free water plus free acid) | Maximum temperature of material during granulation | Temperature of granules during drying | Weight-proportion of granules passing a 5-mesh screen but retained on a 20-mesh screen | Remarks |
|---|---|---|---|---|
| Per cent | °C. | °C. | Per cent | |
| 19.4 | 30 | 30 | 61 | Remainder mostly larger than 5-mesh. |
| 19.4 | 30 | 52 | 16 | Remainder larger than 5-mesh. |
| 18.2 | 68 | 30 | 87 | Remainder mostly larger than 5-mesh. |
| 18.2 | 68 | 61 | 84 | Do. |
| 18.2 | 68 | 86 | 53 | Remainder larger than 5-mesh. |
| 16.8 | 87 | 30 | 94 | Remainder mostly larger than 5-mesh. |
| 16.8 | 87 | 75 | 94 | Do. |
| 16.8 | 87 | 94 | 89 | Do. |

From the above tests, it will be noted that the effect of variations in drying temperature on the proportion of uniform 5–20-mesh granules obtained becomes less as the amount of solution phase in the superphosphate is decreased and as the granulation temperature is increased. Thus, with 16.8% of solution phase, which is the minimum amount of solution phase that will facilitate granulation of this material, a variation from 30° C. to 75° C. during drying causes no difference in the amount of uniform 5–20-mesh granules produced.

However, when the drying temperature of this same material, containing 16.8% of solution phase and granulated at 87° C., is increased to 94° C., which is 7° above the granulating temperature, the proportion of 5–20-mesh granules obtained in the end product is reduced from 94 to 89%.

TABLE IV.—*8–16–16 mixture*

| Solution phase | Maximum temperature of material during granulation | Temperature of granules during drying | Weight proportion of granules passing a 5-mesh screen but retained on a 20-mesh screen | Remarks |
|---|---|---|---|---|
| Per cent | °C. | °C. | Per cent | |
| 9.5 | 30 | 30 | 18 | Remainder larger than 5-mesh. |
| 9.5 | 30 | 45 | 0 | All granules much larger than 5-mesh. |
| 8.3 | 65 | 30 | 57 | Remainder mostly larger than 5-mesh. |
| 8.3 | 65 | 70 | 49 | Remainder larger than 5-mesh. |
| 7.0 | 90 | 80 | 89 | Remainder mostly larger than 5-mesh. |
| 7.0 | 90 | 90 | 87 | Remainder mostly larger than 5-mesh. |
| 7.0 | 90 | 95 | 81 | Remainder mostly larger than 5-mesh. |

From the above tests, it will be noted that the effect of variations in drying temperature on the proportion of uniform 5–20-mesh granules obtained becomes less as the mount of solution phase in the mixture is decreased and as the granulation temperature is increased. Thus, with 7% of solution phase, which is the minimum amount of solution phase that will facilitate granulation of this mixture, a drying temperature of 80° was ideal and produced an end product, 89% of which was 5–20 mesh in size. When the drying temperature of this same mixture, containing 7% of solution phase and granulated at 90° C., is increased to 90° C., the resulting proportion of 5–20-mesh granules in the end product is reduced to 87%. A still higher drying temperature of 95°, which is 5° higher than the granulating temperature, still further depresses the proportion of 5–20-mesh granules obtained to 81%.

Tables III and IV show that better results are obtained when the drying temperature does not exceed, and is preferably maintained below the granulating temperature.

Having thus described our invention, what we claim for Letters Patent is:

1. A continuous process for producing fertilizer granules of predetermined physical structure and substantially uniform size and shape, directly from superphosphate, which comprises, mechanically disintegrating the superphosphate, thence screening this disintegrated material, thence subjecting a continuous stream of the disintegrated, screened material to cascading action in the presence of a non-drying atmosphere, the while heating the material to such a temperature between 60° C. and 100° C. and maintaining a respective and substantially constant solution phase content in the material between 20.9% and 15.9% in correlation with said temperature as will engender a fluidity of the solution phase to cause agglomeration of the fine particles and form granules of uniform size and to prevent agglomeration of the large particles at any stage during the cascading action, thence allowing the continuous flow of the agitated mass to fall directly into a cooling medium, thereby causing a rapid congealing and drying of the surfaces of the resulting granules, and preventing further agglomeration, and maintaining uniformity in size and structure.

2. A continuous process for producing fertilizer granules of predetermined physical structure and substantially uniform in size and shape, directly from partially cured superphosphate containing 15.9 to 20.9% solution phase in equilibrium with the solid phase, which comprises mechanically disintegrating this superphosphate, thence screening this disintegrated material, thence subjecting a continuous stream of the disintegrated, screened material to cascading action in the presence of a non-drying atmosphere, the while heating the material to such a temperature between 60° C. and 100° C. and maintaining a respective and substantially constant solution content in the material between 20.9% and 15.9% in correlation with said temperature as will engender a fluidity of the solution phase to cause agglomeration of the fine particles and form granules of uniform size, and to prevent agglomeration of the large particles at any stage during the cascading action, thence allowing the continuous flow of the agitated mass to fall directly into a cooling medium, thereby causing a rapid congealing and drying of the surfaces of the resulting granules, and preventing further agglomeration, and maintaining uniformity in size and structure.

3. A continuous process for producing fertilizer granules of predetermined physical structure and substantially uniform in size and shape, directly from a complete fertilizer mixture containing superphosphate and 7% to 20% solution phase in equilibrium with the solid phase, which comprises, mechanically disintegrating this material, thence screening this disintegrated material, thence subjecting a continuous stream of the disintegrated screened material to cascading action in the presence of a non-drying atmosphere, the while heating the material to such a temperature between 60° C. and 100° C. and maintaining a respective and substantially constant solution content in the material between 20.9% and 15.9% in correlation with said temperature as will engender a fluidity of the solution phase to cause agglomeration of the fine particles and form granules of uniform size, and to prevent agglomeration of the large particles at any stage during the cascading action, thence allowing the continuous flow of the agitated mass to fall directly into a cooling medium, thereby causing a rapid congealing and drying of the surfaces of the resulting granules, and preventing further agglomeration, and maintaining uniformity in size and structure.

4. A continuous process for producing fertilizer granules of predetermined physical structure and substantially uniform in size and shape directly from hot, fresh den superphosphate, containing substantially 11% free water and substantially 8.5% free phosphoric acid, which comprises mechanically disintegrating this superphosphate, thence screening this disintegrated material, thence subjecting a continuous stream of the disintegrated, screened material to cascading action in the presence of a non-drying atmosphere, the while heating the material to a temperature of substantially 85° C., and maintaining substantially 11% moisture content in the material in correlation with said temperature as will engender a fluidity of the solution phase to cause agglomeration of the fine particles and form granules of uniform size, and to prevent agglomeration of the large particles at any stage during the cascading action thence allowing a continuous flow of the agitated mass to fall directly into a cooling medium, thereby causing a congealing and drying of the surfaces of the resulting granules, and preventing further agglomeration, and maintaining uniformity in size and structure.

5. A process as claimed in claim 1 in which the temperature is maintained constant by an adjustable, counter-current flow of hot gases.

6. A process as claimed in claim 1 in which the heating of the material in the non-drying atmosphere is intensified to produce agglomeration of the fine particles during the early stages of the cascading action so that, with continued cascading at a constant temperature, hard, compact, dense granules are formed.

7. A process as claimed in claim 1 in which the heating of the material in the non-drying atmosphere is mollified to produce agglomeration of the fine particles during the latter stages of the cascading action so that soft, loosely-knitted, porous granules are formed just prior to their passage into the cooling and drying medium.

8. A process as claimed in claim 2 in which rapid cooling in the cooling and drying step is effected by vigorous cascading action at atmospheric temperature without artificial drying.

9. A process as claimed in claim 3 in which a dry, powdered material is added to the granular mass just prior to its passage into the cooling and drying medium.

10. A process as claimed in claim 1 in which dry, powdered superphosphate is added to the granular mass immediately prior to its passage into the cooling and drying medium.

JOHN O. HARDESTY.
KENNETH D. JACOB.
WILLIAM H. ROSS.